UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLUISH-RED AZO DYE.

SPECIFICATION forming part of Letters Patent No. 535,037, dated March 5, 1895.

Application filed November 8, 1894. Serial No. 528,243. (Specimens.)

*To all whom it may concern:*

Be it known that I, ARTHUR WEINBERG, a citizen of Prussia, and a resident of Frankfort-on-the-Main, Germany, have invented new and useful Improvements in the Production of Bluish-Red Azo Dye-Stuffs, of which the following is a specification.

My invention relates to an improvement in the manufacture of azo-coloring matters from the perichlornaphtoldisulfo acid which has been described in the application for United States Letters Patent filed September 7, 1894, and bearing the serial number 522,340, and consists in combining the said acid with the diazo-derivatives of dehydrothiocompounds, such as dehydrothioparatoluidin, dehydrothiometaxylidin or their sulfo acids.

In carrying out my invention I proceed for instance as follows: 24.1 kilos of dehydrothioparatoluidin are diazotized by means of forty kilos of muriatic acid and seven kilos of nitrite of soda. The yellow solution of the diazocompound is allowed to run into the solution of thirty-six kilos perichlornaphtoldisulfo acid kept alkaline by means of carbonate of soda. A dark red solution is formed from which the coloring matter is precipitated by addition of common salt.

If instead of dehydrothioparatoluidin similar compounds such as the so called primulinbase, the dehydrothioxylidins or their sulfo acids are employed the method as described in the foregoing example and its result are not materially altered.

All these dye stuffs dye unmordanted cotton brilliant bluish red shades which are very fast to light and are not at all changed by the influence of mineral acids.

Having thus described my invention and in what manner it may be performed, what I claim, and desire to secure by Letters Patent, is—

1. The process of producing red azo dyestuffs by bringing together the alkaline solution of perichlornaphtoldisulfo acid with the diazotized dehydrothiocompounds substantially as described.

2. The red coloring matter derived from perichlornaphtoldisulfo acid and dehydrothiocompounds, which is a dark brown powder, easily soluble in cold water and in hot spirit with red color, dissolving in concentrated sulfuric acid with violet color, the latter solution forming a red precipitate by an excess of water and dyeing unmordanted cotton a bright bluish red shade substantially as described.

In testimony that I claim the foregoing as my invention I have signed my name, in presence of two witnesses, this 26th day of October, 1894.

ARTHUR WEINBERG.

Witnesses:
ALVESTO S. HOGUE,
JEAN GRUND.